May 23, 1939.  J. H. VAN WAGENEN  2,159,915
FREEWHEELING REGISTER INSTALLATION
Original Filed April 2, 1932
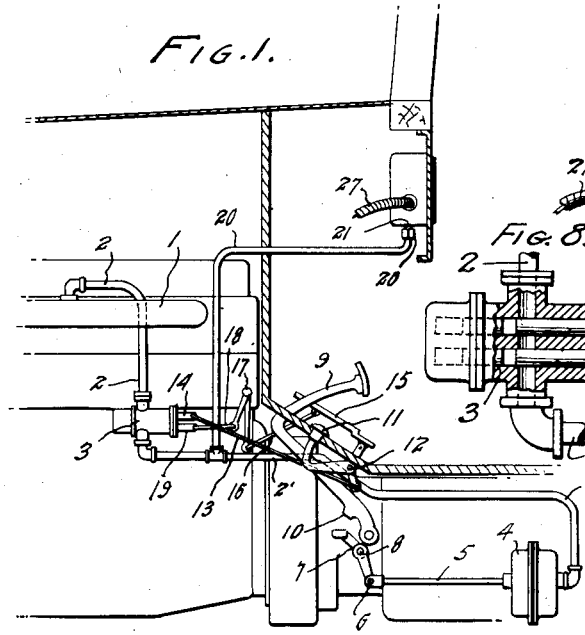
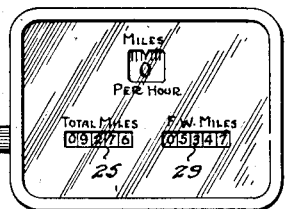
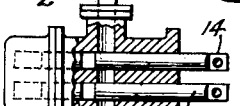
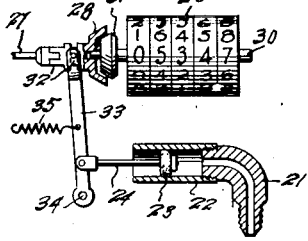
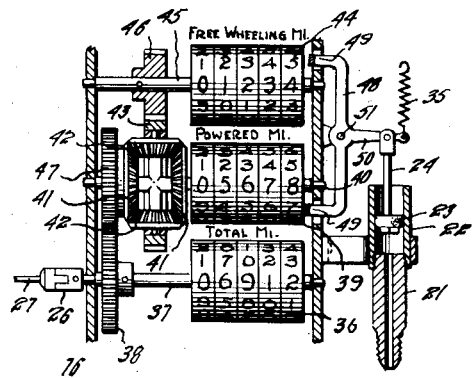
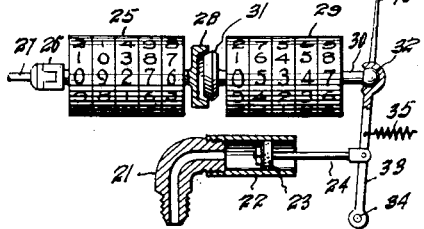
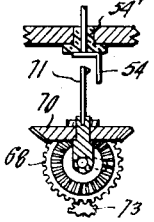
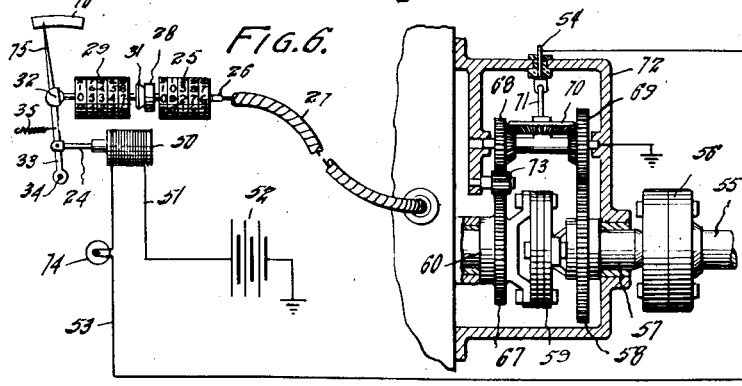
Inventor
JAMES H VAN WAGENEN Patented May 23, 1939

2,159,915

UNITED STATES PATENT OFFICE 2,159,915

FREEWHEELING REGISTER INSTALLATION

James H. Van Wagenen, Washington, D. C.; Lois J. Van Wagenen, executrix of said James H. Van Wagenen, deceased, assignor to Lois J. Van Wagenen Application April 2, 1932, Serial No. 602,727
Renewed October 12, 1938

5 Claims. (Cl. 235—95).

This invention relates to free wheeling register installations.

With the advent of the so termed "free wheeling" in the automotive art it has become desirable to determine, by actual registration, the advantages secured by such installations. At the present time, while economies of gasoline consumption are assumed, there is no device available which will enable the motorist to compare the performance of a car equipped with a free wheeling unit with that of the erstwhile conventional car.

It is therefore an object of the present invention to provide a device which will accurately measure and/or register the extent of free wheeling.

Another object is to register the performance of free wheeling devices in terms of the unpowered milage.

Another object is to devise an instrument which can be attached to or built into a car and which is automatically operable to register the effect of the operation of the free wheeling installation.

A further object is to devise a novel automobile accessory which will register coasted or free wheeling milage.

Another object is to provide an automobile instrument which will register unpowered milage.

Yet another object is to provide a novel dashboard instrument which at once registers the coasted or free wheeling milage and compares this to the total milage.

A still further object is to provide a pneumatically actuated free wheeling indicator.

An additional object is to provide an instrument which will register the unpowered and the total milage of a vehicle.

A further object is to provide an instrument which will register the powered milage, the unpowered milage and the total milage of a vehicle.

With these and other objects in view the invention comprises the provision of a milage indicator which is automatically brought into operation upon the actuation of the free wheeling device and which operates to indicate the free wheeling milage and/or the powered milage and/or the total milage.

There are a number of specifically different methods of effecting this result and in order to illustrate these, different devices are shown in the accompanying drawing, of which:

Figure 1 is a side elevation of a vacuum operated clutch release or free wheeling unit and an associated instrument which measures the amount of free wheeling.

Fig. 2 is a front elevation of the instrument dial.

Fig. 3 is a modified form of the invention in which the total milage is indicated and this resolved into components, namely free wheeling milage and the powered milage.

Fig. 4 is another modified form of the invention showing a simple device for recording the amount of free wheeling.

Fig. 5 is a further modification in which the free wheeling indicator is associated in a special manner with a typical odometer.

Fig. 6 is a view of another modification of the invention in which the free wheeling registering unit is electrically actuated.

Fig. 7 is an enlarged detail of Figure 6 showing the switch mechanism.

Fig. 8 is a cross sectional detail of the control valve.

As noted hereinbefore, the major object of the present invention is to develop mechanisms for indicating the unpowered or free wheeling milage of a vehicle. When the clutch is disengaged, as by operation of the free wheeling device, the car coasts. In order to simply and generically express the instrument employed in the present situation, and particularly to bring out its function, the free wheeling milage indicator will be hereinafter referred to as a "cotometer". Etymologically considered the root of this word is derived from the French verb "cotoyer" meaning to coast, plus the well known suffix "meter", meaning to measure. Eliding the verb ending gives the euphonious word "cotometer", defining a means or instrument for measuring the coasting milage of an automobile or similar vehicle.

As indicated hereinbefore, the concept of indicating free wheeling milage may be practically effectuated by a number of specifically different mechanisms. These different mechanisms may be associated with different types of free wheeling units and those shown may, with simple modifications, be adapted to any known type of free wheeling installation.

In order to describe a particular embodiment of the invention so as to enable those skilled in the art to practice it, there is shown in Figure 1 a cotometer associated with a vacuum operated clutch release. The mechanisms involved in the release of the clutch are well known and need not be described fully. The one chosen for illustration in Fig. 1 is the well known Bendix type which is installed on a number of vehicles. This, as is known, may comprise a vacuum intake manifold 1 with which communicates conduit 2. Interposed in the conduit 2 is a valve 3 which, when operated in the manner to be described later, permits application of the vacuum or reduced pressure in the manifold to certain of the mechanisms or linkages associated with the clutch to release the latter. For this purpose the conduit 2 is extended rearwardly, as shown at 2', and is connected with a suitable cylinder 4. This cylinder, for example, may comprise a flexible diaphragm which is movable in response to the variations in pressure in the cylinder. Associated with the operative face of the cylinder is a movable rod 5. This rod is adapted to move longitudinally according to variations in the degree of displacement of the diaphragm. At its free end rod 5 is pivoted at 6 to a suitable lever 7 pivotally mounted at 8. By a linkage (not shown) the lever 7, upon movement about its pivot, is adapted to effect engagement and disengagement of the clutch. Positioned adjacent the lever 7 is the usual clutch pedal 9 which has a nose 10 adapted to engage the end of the lever 7. In a manner well known to those skilled in the art, the association of lever 7 and clutch pedal 9 forms, so to speak, an over-running connection so that when the automatic clutch cylinder 4 is opened to the vacuum in the intake manifold, rod 5 moves to the right, as shown in Fig. 1, causing pivotal movement of the lever 7 and consequent disengagement of the clutch, without however moving the lever 9. When the vacuum is cut out, as for example by operation of the control valve, to be described, the clutch may be disengaged in the conventional manner by depressing the pedal 9. In this case the nose piece engages the end of lever 7 and causes pivotal movement of the latter with consequent disengagement of the clutch.

The control member 3 comprises in effect a double valve. As shown in Fig. 1 automatic clutch cylinder 4 may be connected up with the vacuum intake manifold or sealed off from it by operation of the control button 11. This member, in the form of a bell crank lever, is suitably pivoted at 12. The short arm of the bell crank is connected by means of a link 13 with the valve member 14. When this control lever is depressed and valve 14 slides out of the valve casing, it establishes communication between the intake manifold and the automatic clutch cylinder 4, when the accelerator is in the proper position.

The accelerator 15 is connected through the link 16, bell crank lever 17 and link 18, with a second sliding valve 19. When the accelerator is depressed the valve 19 moves in and closes off the intake manifold from the automatic clutch cylinder so that the power of the engine is transmitted through the engaged clutch to the driving wheels. When, however, the accelerator 15 is raised, the bell crank lever 17 is swung about its pivot and the valve 19 is drawn from its seat, thereby establishing communication between the clutch cylinder and the engine. If, in these circumstances, the control pedal 11 is depressed, the clutch will automatically become disengaged by the operation of the vacuum cylinder 4.

In the preferred modification, valve 3 is utilized as an actuating means for the improved cotometer. As shown in Fig. 1, a fluid line 20 is tapped off the main line 2 between control valve 3 and the cylinder 4. When a negative pressure is set up on one of the operating faces of the diaphragm of cylinder 4 by reason of the opening of the two valve members 14 and 19, a reduced pressure will likewise be set up in line 20. This reduced pressure is then utilized to bring the cotometer into operation so that it will register during the period a reduced pressure is maintained in the line 20, or in other words during the period the car is free wheeling.

This vacuum actuation of the cotometer may be utilized as the actuating principle for a number of specifically different structures, for example those shown in Figs. 3, 4 and 5.

The cotometer may be associated with the usual odometer in a number of ways to accomplish different results. For example, as shown in Fig. 3, association may be such as to indicate the three factors of milage, namely free wheeling milage, powered milage, and the sum of these, namely the total milage. Or again, and as shown in Fig. 5, the association of the cotometer and odometer may be such as to indicate the total milage and the free wheeling milage. Or yet again, and as shown in Fig. 4, a cotometer may be provided which is driven directly by a ground wheel and which operates only when the device is in free wheeling and without any direct cooperation with the typical odometer or total milage indicator. This latter is desirable in those situations where a free wheeling device is installed as a new accessory on an old car.

In all three of these the actuating mechanism may be substantially the same construction, as shown in detail in Figs. 3 and 4. In each case the actuating mechanism per se may include a nipple 21 suitably threaded at its end so as to engage the nut 20' which connects the nipple to the vacuum line 20. The nipple is formed with a central aperture which communicates with the cylinder or chamber 22. This chamber is provided with a suitable piston or diaphragm indicated generally at 23. Suitably attached to this piston or diaphragm is a link member 24 which is connected at its other end to a linkage through which movement is transmitted so as to effect clutching of the cotometer to its driving member.

A simple form of association of the cotometer with a typical odometer is shown in Fig. 5. Here the odometer is indicated at 25. This is provided with a main driving shaft 26 which is connected through a suitable torsion cable or other mechanism 27 to the propeller shaft or ground wheel, or any part of the vehicle from which motion proportional to vehicle travel may be taken off. The main shaft or prime mover of the odometer is formed at its other end with a clutch face 28. Positioned adjacent the odometer 25 is a cotometer 29. The central shaft 30 of this cotometer is formed, on that end adjacent the odometer, with a clutch face 31 cooperatively designed with respect to clutch face 28 so that when the two are brought into engagement shafts 26 and 30 will rotate together. The other end of shaft 30 is provided with a ball and socket joint, or any other equivalent such as a typical yoke, 32. The socket of this connection is attached to an arm 33 which is pivoted at its lower end at 34. At an intermediate point on this arm is connected the link 24. There is suitably positioned in the assemblage, as for example, at the connection of arm 33 with link 24, a retracting spring 35, the purpose of which is to normally hold the cotometer shaft 30 disengaged with respect of the odometer shaft 26. It will be understood that the cotometer shaft 30 is suitably splined with respect to its associated units disc so as to permit relative horizontal movement to effect engagement and simultaneous rotation with odometer shaft 26.

The operation of this type of structure will readily be appreciated. In normal circumstances when a car is driven under power the cotometer shaft 30 does not rotate, because clutch member 31 is disengaged from clutch member 28 due to the retractive action of spring 35. When, however, a reduced pressure is set up within line 20, the piston or equivalent member 23 is displaced and a corresponding movement, multiplied or not as desired, is imparted to member 33. This displacement being transmitted to the shaft 30 causes engagement of clutch member 31 with its corresponding female member 28 to thereby effect simultaneous rotation of shafts 26 and 30. In other words, while the reduced pressure is set up in line 20, or while the car is in free wheeling, the cotometer 29 operates to register the milage during that period. When the free wheeling device is disconnected, as by releasing the control lever 11, or by depressing the accelerator 15, the line 20 is cut off from connection with the intake manifold. The spring 35 then displaces the link 24 and its connected member 33 to longitudinally displace the cotometer shaft 30 and cause disengagement of the cotometer from the odometer.

If desired, as indicated above, the total milage of the car may be resolved into its components so as to record the powered and unpowered milage. For this purpose an instrument is provided which comprises an odometer, that is to say a total milage indicator, a cotometer or a coasted milage indicator, and a powered milage indicator. A typical example of such type of structure is shown in Figure 3.

This instrument may comprise an odometer or total milage indicator 36 which is driven by means of a suitable driving cable or shaft indicated at 27. This shaft connects with the main shaft 37 of the odometer and upon this is mounted the gear 38. The shaft 27, gear 38 and shaft 37 rotate while the vehicle is in motion whether it is positively driven or is coasting. Positioned adjacent the odometer 36 are two other milage registers. One of these, 39, is mounted within suitable bearings and is provided with a central shaft 40. At the end of this shaft is mounted a differential gear comprising the beveled gears 41 and the pinion gears 42. This differential is driven by the odometer shaft 26 through gears 38 and 47 which are permanently in mesh. The stub shafts of the pinion gears 42 are mounted in a cage 43 in the usual manner. This cage is provided with gear teeth. A second milage indicator 44 provided with central shaft 45 is positioned adjacent powered milage indicator 39. On one end of the shaft 45 is mounted a gear 46 which meshes with the gear of the cage of the differential.

Means are provided for braking or holding either the free wheeling milage indicator 44 or the powered milage indicator 43. This may comprise, as a simple embodiment, a double arm lever 48, upon the ends 49 of which are formed friction surfaces. This lever is formed with an integral or detachable arm 50 and the whole unit is pivoted about the point 51.

To the end of the arm 50 is pivoted a link 24 which is similar in function to the link 24 of the unit shown in Fig. 4. This link is suitably attached to a piston or diaphragm 23 which is operatively mounted in the cylinder 22. The other end of this cylinder is connected through the vacuum line 20 so as to be cut in and out of operation upon the described functioning of valve 3.

As shown in the described embodiment, a spring 35 is provided which tends normally to hold the link 24 and piston or diaphragm 23 at one end of its stroke.

The operation of this type of structure will be appreciated from the foregoing description. In normal operation, that is to say when the car is being driven by the engine, motion is taken off the ground wheel or the main shaft of the vehicle and is transmitted through torsion cable 27 to the odometer 36. The rotation of shaft 27 and operation of odometer 36 will continue as long as the car is in motion. While the car is being driven from the engine, valve 3 is closed and consequently there is no reduced pressure in the line 20. In these circumstances the spring 35 will operate to swing the lever mechanism 48—50 about the pivot 51 and will cause the brake shoe 49 to frictionally engage and hold the free wheeling milage indicator 44.

Motion is transmitted from gear 38 to gear 47 and from this through the differential either to the milage indicator 39 or milage indicator 44, depending upon the position of the lever mechanism 48—50. In normal operation, as just described, when the free wheeling milage indicator 44 is held by reason of the action of brake shoe 49, and consequently the cage 43 of the differential is held, motion is transmitted from gear 38 to gear 47 and thence to the beveled gear 41, these gears rotating the pinion gears 42. It will be seen that in these circumstances the odometer elements 36 and 39 rotate in the same sense and at the same speed.

When, however, the valve 3 is opened so as to place the cylinder 22 in communication with the intake manifold, the link 24 is drawn within the cylinder against the action of spring 35 and the lower brake shoe 49 engages and holds the powered milage indicator 39. In these circumstances, motion is transmitted from the gear 38 to gear 47 and thence to the pinion gears 42 and cage 43. The cage therefore rotates and imparts suitable rotation, through the gear 46, to the free wheeling milage indicator 44, the latter rotating in the same direction and at the same speed as indicator 36.

Therefore, depending upon the operation of the valve 3, this instrument at all times registers three factors, namely the total milage, the powered milage and the free wheeling milage. When the free wheeling device is operating, the powered milage indicator 39 is held against rotation, in the manner described, and then the total milage and the free wheeling milage are indicated. When, however, the free wheeling device is not in operation, indication of the total milage and the powered milage is obtained. This instrument therefore indicates directly all the important factors with respect to milage. It enables the car operator not only accurately to determine at any time the free wheeling milage, but also the total powered milage. It also enables him to determine the efficiency of the car in terms of fuel consumption. Other things being equal, the provision of a device which registers the powered milage and the free wheeling milage, and the total of these two, gives a very good indication of the condition of the car. Such an instrument, for example, would be particularly valuable in respect of determining the resale value of a car. This instrument would show, for example, the number of miles that the car had travelled under power; in other words would show the relative extent of engine operation under load. The instrument would also enable the operator to determine whether or not he was getting the full beneficial effect of a free wheeling installation. This would immediately be apparent by the comparison of his free wheeling milage and powered milage, which could immediately be read off from the instrument.

The device shown in Fig. 4 is particularly designed as a separate cotometer which does not cooperate directly with the odometer already installed on the car. This may be made up as a unit and attached to the dashboard of a car in which a free wheeling unit has been installed. For simplicity the casing of the device has been omitted. This unit is substantially identical with the cotometer unit shown in Fig. 5 and comprises the indicator 29, with the shaft of which is associated a clutch element 31. Unlike the unit shown in Fig. 5 the present unit is adapted to be driven directly by the torsion cable or other suitable mechanism associated with the ground wheel or propeller shaft.

Motion is adapted to be transmitted to the registering mechanism only when the car is in free wheeling. To this end the clutch member 28 is associated with the cable 27 so that under the action of clutch lever 33 it is adapted to engage the cooperating clutch member 31 and cause actuation of the milage indicator 29.

As will be understood from the description of the apparatus given, when the car is in motion and being driven by the motor, that is to say when the valve 3 or equivalent member is closed, there is no differential pressure set up in the cylinder 22, and registering mechanism 29 is disengaged from the rotating cable 27. In other words, the clutch member 28 is moved and held out of engagement with clutch member 31 by the spring 35. When the valve 3 is opened and the car is in free wheeling a differential pressure is set up in the cylinder 22 which causes the lever 33 to move clutch member 28 into engagement with clutch member 31. During the period of time that the vacuum is maintained in the cylinder 22 the clutch members will be held together and will rotate in unison, thus causing rotation of the odometer shaft and registration of the milage during that period. When the vacuum is cut off, spring 35 retracts the lever 33 and disengages clutch 28—31.

While a vacuum operation of the improved mechanism has been described, it will be understood that other methods of actuation may be employed. A typical example of this is electrical actuation, as shown in Figure 6. In this figure a combination odometer and cotometer, such as is shown in Fig. 5, is employed. This is provided in the manner described with the actuating lever 33. This lever is moved in one direction by the spring 35 to disengage the cotometer 29 from the odometer or total milage indicator 25. The lever 33 is moved in the opposite direction by electrical means when the car is in free wheeling. In this particular modification a different method is employed to start registration of the unpowered milage. The actuating means for the lever 24 may be a very simple electrical apparatus and may comprise, for example, a suitable solenoid 50. From the solenoid coil the conductor 51 connects with a suitable source of electricity, such as battery 52. The other conductor, 53, is connected with the switch member 54 which is operated when the propeller shaft of the car tends to rotate faster than the engine.

The mechanism for effecting actuation of the switch member 54 and thereby causing operation of the free wheeling indicator may be of a variety of constructions, a typical one being shown in Figure 6. As shown in Figure 6, the main engine shaft 55 connects through the joint 56 with the stub shaft 57. On the stub shaft 57 is mounted a gear 58 and the shaft itself is connected through the flexible fiber joint 59 with the propeller shaft 60. Propeller shaft 60 is likewise provided with a ring gear 67 and gears 58 and 67 are interconnected with a differential mechanism. This comprises the combined spur and level gears 68 and 69 and pinion gear 70. Interposed between the ring gear 67 and the pinion gear 68 is a small gear 73, the purpose of which is to impart reverse directional rotation to bevel gear 68 with respect to the bevel gear 69. Suitably associated with the pinion gear 70 is a switch arm 71. This is adapted to make contact with the corresponding switch member 54 which is shown as insulated from the casing 72 by means of the insulation bushing 54'. The casing 72 is provided with suitable journal sections to mount the shafts of gears 68, 69 and 73.

The operation of this structure will be understood from the preceding description. When the car is driven by the motor, power is transmitted through the engine shaft 55, joint 56 and through a flexible joint 59 to the propeller shaft 60. Displacement between the angular position of engine shaft 55 and propeller shaft 60, which is permitted by an appropriate flexible coupling 59, will cause a differential angular movement of gears 58 and 67 and will cause an epicyclic movement of pinion gear 70, which will provide counterclockwise movement of switch 71, as seen in Fig. 7. In these circumstances the switch members 71—54 will be disengaged and no current will flow through the circuit. During this period of operation the odometer 25 is of course being driven by the flexible cable 27 which is suitably connected to the propeller shaft. When, however, the car is coasting, whether or not the clutch is disengaged, propeller shaft 60 tends to drive the shaft 55. This causes a reverse angular displacement of the gears 67 and 58, and, through the differential gearing, causes epicyclic movement of the pinion gear 70 and moves switch 71 in a clockwise direction, as shown in Fig. 7. This movement effects engagement of switch elements 71—54, thereby closing the circuit and causing the flow of current through the solenoid coil. The solenoid being thus energized moves the lever 33 against the action of spring 35 to effect engagement of the clutch members 31 and 28. In these circumstances the registering units 25 and 29 rotate in unison and this uniform rotation is maintained so long as the propeller shaft 60 tends to drive the shaft 55; in other words, either so long as the clutch is disengaged or so long as the car is moving forwardly without applied power.

While a particular mechanism has been shown and described so as to cause relative differential movement between the propeller shaft and engine shaft to actuate the unpowered milage indicator, it will be understood that other specific means may be employed. This mechanism is given as illustrative of any mechanism which utilizes the torsion effect in the transmission. In the operation of the device of Fig. 6 it will be clearly understood that the indicator 29 is an unpowered milage indicator and obviously is applicable to any car, regardless of a free wheeling installation.

It will likewise be appreciated that in lieu of utilizing a pneumatic actuation, such as the vacuum, or electrical actuation, such as the torsional actuated solenoid, mechanical methods may be similarly employed.

Thus, for example, in lieu of utilizing electrical actuation in the device of Fig. 6, pneumatic actuation may be secured, as for example by substituting a vacuum cylinder for the solenoid 50 and suitably positioning the vacuum valve at the switch 54—71 in Fig. 7. Likewise, if desired, in lieu of this vacuum operation of the device shown in Fig. 6, mechanical operation may readily be secured.

It will be observed that in the operation of all of the modified forms of the invention shown, an indication of the fact that the car is in free wheeling or is moving without applied power is readily had by the displacement of mechanical elements in the combination, and also in the device shown in Fig. 6 by the closing of the electrical circuit. If desired, and as shown in the drawing, this indication may be clearly shown in any desired manner. For example, in the device of Fig. 6 the indicator 74 may comprise a lamp positioned in the electrical circuit 51—50—53—54; or the pointer 75 positioned at any suitable position on the displaceable portions of the apparatus. As a typical example, the lever 33 may be extended in the form of a pointer 75, which is associated with a suitable visual dial 76. Such a type of so-to-speak mechanical indication may be utilized in the devices shown in all of the figures of the drawing and, if desired, the electrical indication may be employed in the electrically operated device of Fig. 6 or by any suitable electrical apparatus.

Likewise, while a number of different specific registering mechanisms have been shown and described, it is to be understood that the invention is not limited to these but is directed broadly to the idea of means for indicating the free wheeling and/or unpowered milage, and/or powered milage, of an automobile. No attempt has been made to exhaustively describe all the means that may be employed to accomplish this, but those given are illustrative and will not only enable those skilled in the art to carry out the invention but also, if desired, enable them to utilize other specific mechanisms for accomplishing the same result. All of these other mechanisms are not particularly described but are comprehended in the broad disclosure described herein and generically stated in the appended claims.

I claim:

1. In an automotive vehicle having an engine, transmitting mechanism and a free wheeling device adapted to disconnect the transmitting mechanism from the engine; the combination of a register and a pneumatically controlled device for registering the milage of the vehicle when the said transmitting mechanism is disconnected, said pneumatically controlled device being automatically actuated upon the operation of the free wheeling device.

2. In an automotive vehicle having an engine provided with an intake manifold, and a transmission, a clutch for the transmission, a pedal connected with the clutch, a pneumatic device connected with the clutch pedal and operated by the reduced pressure in the intake manifold of the engine; the combination of a cotometer, control means therefor, a fluid conduit connecting the intake manifold and cotometer control means; a pneumatic valve interposed in the fluid conduit between the intake manifold and said pneumatic device and a control member connected with the valve and operating to submit the pneumatic device and the cotometer control means to the action of the reduced pressure within the manifold to effect their simultaneous operation.

3. In an automotive vehicle, a free wheeling device, means to effect the operation of the free wheeling device by the vacuum established in the intake manifold and means controlled by the said vacuum and operative upon a predetermined condition of the free-wheeling device to measure only the amount of free wheeling effected while the free wheeling device is in operation.

4. In an automotive vehicle having an engine provided with an intake manifold and a vacuum controlled free wheeling mechanism, a cotometer, a fluid conduit connecting the manifold to the free wheeling mechanism; means interconnecting the free wheeling mechanism and the cotometer, control means operable to establish communication between the manifold and the free wheeling mechanism through said conduit to effect the operation of the free wheeling mechanism by vacuum established in the intake manifold, said control member also simultaneously functioning to effect the operation of the cotometer, the cotometer thereby registering the mileage traversed by the vehicle only when the free wheeling mechanism is in operative position.

5. In a vehicle having an engine provided with an intake manifold, a free wheeling mechanism operated by vacuum developed in the intake manifold, in combination, a cotometer, means to drive the cotometer, and control means connected respectively with the free wheeling mechanism and cotometer driving means, and operable upon movement to a predetermined position to effect simultaneous operation of the free wheeling mechanism and the cotometer driving means whereby the cotometer is actuated to register the mileage of the vehicle while the said free wheeling mechanism is operative.

JAMES H. VAN WAGENEN.